No. 757,547. PATENTED APR. 19, 1904.
A. F. GILBERT.
COMBINED WINDOW CURTAIN AND SHADE ROLLER HOLDER.
APPLICATION FILED OCT. 14, 1903.
NO MODEL.
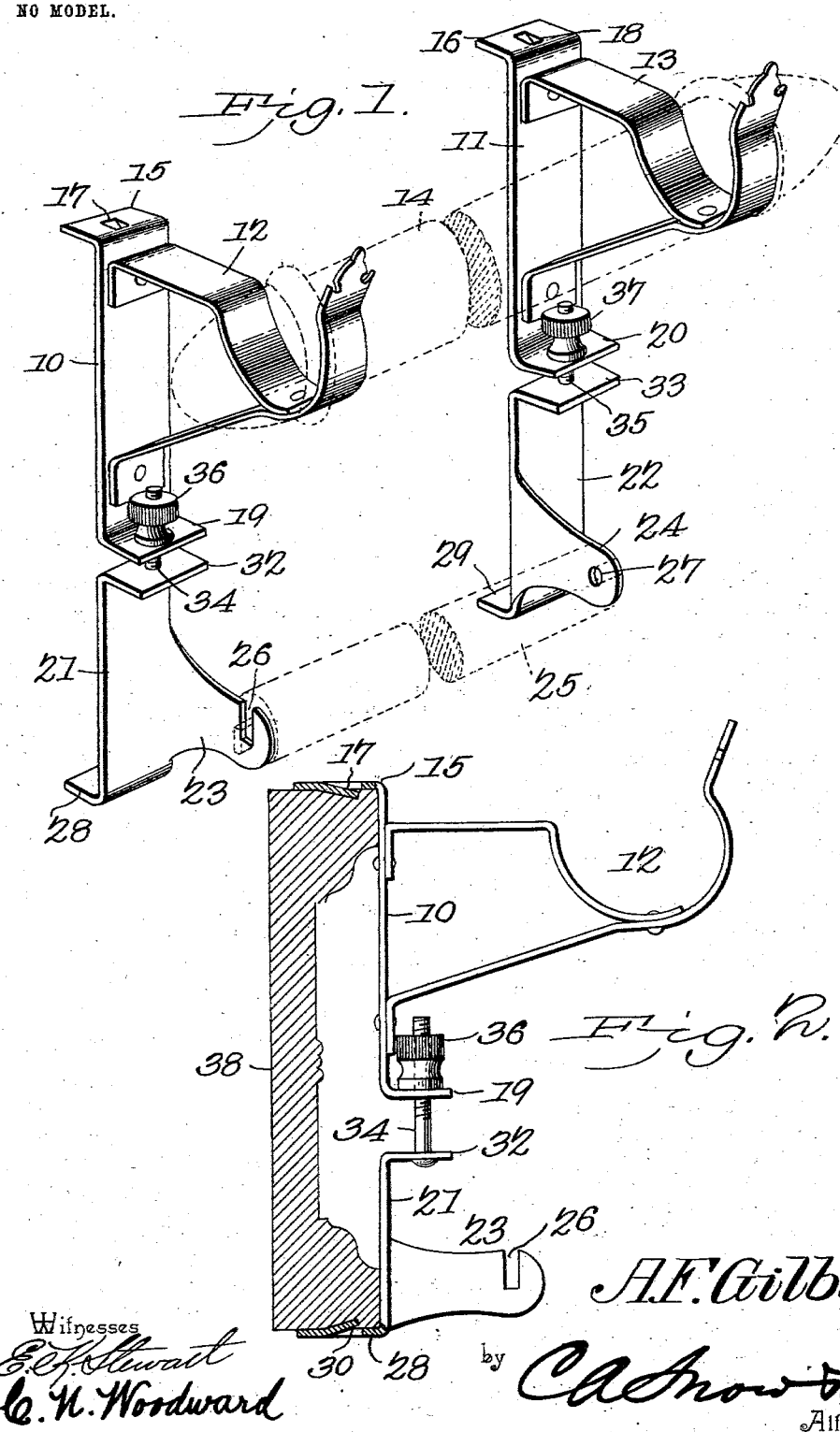
Witnesses
E. F. Stewart
C. N. Woodward
A. F. Gilbert,
Inventor.
by C. A. Snow & Co.
Attorneys No. 757,547. Patented April 19, 1904.

UNITED STATES PATENT OFFICE.

ADAM F. GILBERT, OF FARMERSVILLE, OHIO.

COMBINED WINDOW-CURTAIN AND SHADE-ROLLER HOLDER.

SPECIFICATION forming part of Letters Patent No. 757,547, dated April 19, 1904.

Application filed October 14, 1903. Serial No. 177,072. (No model.)

*To all whom it may concern:*

Be it known that I, ADAM F. GILBERT, a citizen of the United States, residing at Farmersville, in the county of Montgomery and State of Ohio, have invented a new and useful Combined Window - Curtain and Shade - Roller Holder, of which the following is a specification.

This invention relates to devices for supporting both the window-curtains and shade-rollers from one supporting means, and has for its object to simplify and improve such devices, so that they may be quickly attached and detached and securely held while in use without the use of holding-screws or nails or other devices which mar or injure the casings; and the invention consists in certain novel features of construction, as hereinafter shown and described, and specified in the claims.

In the drawings illustrating the invention, in which corresponding parts are denoted by like designating characters, Figure 1 is a perspective view of a pair of the improved brackets in operative position. Fig. 2 is a side elevation of the device applied.

The improved device consists of two brackets 10 11, spaced apart to conform to the window and provided with means, as hangers 12 13, for the support of the curtain-pole, (indicated only by dotted lines at 14,) this pole supporting the hangings or curtains in the usual manner. The upper end of the bracket members 10 11 are respectively provided with rearwardly-extending offsets or lugs 15 16, having spurs 17 18, while the lower ends are provided with reversely-disposed lateral lugs 19 20, having apertures therethrough, as shown. Two other brackets 21 22 are also provided, having hangers 23 24 for the support of the shade-roller, (indicated only by dotted lines at 25,) the hanger 24 having the aperture 27 for the stationary pivot of the shade-roller and the hanger 23 having the slot 26 for the rotating pivot of the usual form. The lower ends of the bracket members 21 22 are provided, respectively, with offsets or lugs 28 29, having spurs 30 and corresponding to but reversed in position from the lugs 15 16 and their spurs 17 18, while the upper ends of the lower bracket members are formed with offsets or lugs 32 33, corresponding to the lugs 19 20 and likewise apertured, as represented. The aperture in the lugs 19 20 and 32 33 are to receive clamp-bolts 34 35, having nuts 36 37, as shown. With a set of brackets thus constructed the curtain-pole and shade-roller may be quickly placed in position by hanging the lugs 15 16 over the upper edge of the casing, as represented at 38, and inserting the lugs 28 29 beneath the opposite edge and clamping them in that position by the bolts 34 35 and their nuts 36 37. By this simple means the device may be quickly applied to any form, design, or width of window-casing and without the use of screws, nails, or other disfiguring fastening means. The only portions which can produce abrasion upon the casing are the small spurs 17, 18, and 30, and these are so slight as to be imperceptible, and, moreover, they occur entirely upon the edges of the casing members, where they will not appear.

The devices may be very quickly attached and detached and require no other implement than a small screw-driver or wrench or may be secured with a sufficient grip by turning the nuts 36 37 with the fingers, and these may be in the form of milled-edged disk nuts for that purpose.

The brackets may be of any desired size or material and may be of any fanciful design and plated or otherwise ornamented, as desired.

Having thus described the invention, what I claim is—

1. In a window curtain and shade holder, a bracket for the support of the curtain-pole having a lateral lug for engagement with one side of the window-casing, a bracket for the support of the shade-roller having a lateral lug for engagement with the opposite side of the casing, and coupling means between said curtain-pole bracket and shade-roller bracket, substantially as specified.

2. In a window curtain and shade holder, a bracket for the support of the curtain-pole having a lateral lug for engagement with one side of the window-casing, a bracket for the support of the shade-roller having a lateral lug for engagement with the opposite side of the casing, and a clamp-screw connecting said curtain-bracket and roller-bracket for adjustably coupling them to said casing.

3. In a window curtain and shade holder, a bracket for the support of the curtain-pole having a lateral lug at one end for engagement with one side of the window-casing and a reversely-disposed perforated lateral lug at its opposite end, a bracket for the support of the shade-roller having a lateral lug at one end for engagement with the opposite side of the casing and with a reversely-disposed perforated lateral lug at its opposite end, and a clamp-bolt engaging said perforated lug and operating to clamp said brackets to the casing, substantially as specified.

4. In a window curtain and shade holder, a curtain-pole bracket having a lateral lug for engagement with one side of a window-casing, a shade-roller bracket having a lateral lug for engagement with the other side of the casing, and adjustable connecting means between said brackets.

In testimony that I claim the foregoing as my own I have hereto affixed my signature in the presence of two witnesses.

ADAM F. GILBERT.

Witnesses:
JOHN G. RUFF,
J. C. ECKTER.